United States Patent
Hirano et al.

(10) Patent No.: US 6,807,895 B2
(45) Date of Patent: Oct. 26, 2004

(54) 3-POSITION STOPPING CYLINDER

(75) Inventors: Akihiro Hirano, Tsukuba-gun (JP); Kaichiro Mitsui, Tsukuba-gun (JP); Mitsunori Magaribuchi, Tsukuba-gun (JP); Takayuki Matsuda, Tsukuba-gun (JP); Futoshi Furumaki, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 57 days.

(21) Appl. No.: 10/292,501

(22) Filed: Nov. 13, 2002

(65) Prior Publication Data

US 2003/0136254 A1 Jul. 24, 2003

(30) Foreign Application Priority Data

Jan. 22, 2002 (JP) ........................................ 2002-013056
Apr. 19, 2002 (JP) ........................................ 2002-118349

(51) Int. Cl.[7] .............................................. F15B 15/14
(52) U.S. Cl. ................. 92/13.6; 92/62; 92/131
(58) Field of Search ................. 91/172; 92/13, 92/13.4, 13.6, 51, 62, 131

(56) References Cited

U.S. PATENT DOCUMENTS

| | | | | |
|---|---|---|---|---|
| 2,484,603 A | * | 10/1949 | Pierre et al. | .................. 91/172 |
| 3,673,926 A | * | 7/1972 | Mohri | ............................. 92/51 |
| 4,773,300 A | * | 9/1988 | Klatt et al. | ..................... 92/62 |
| 5,012,725 A | * | 5/1991 | Leary | .............................. 92/62 |
| 5,067,323 A | * | 11/1991 | Bennett et al. | ............... 92/13.6 |
| 5,189,942 A | * | 3/1993 | Ohkubo | ....................... 92/13.6 |
| 6,408,740 B1 | * | 6/2002 | Holt et al. | .................... 92/13.6 |

FOREIGN PATENT DOCUMENTS

JP   2001-248610   9/2001

* cited by examiner

Primary Examiner—Thomas E. Lazo
(74) Attorney, Agent, or Firm—Oblon, Spivak, McClelland, Maier & Neustadt, P.C.

(57) ABSTRACT

A pusher which has a stroke shorter than that of a piston at either position on a head side or a rod side in a cylinder main body and which serves as both means for pushing the piston from a stroke end back to an intermediate stopping position and means for stopping the piston at the intermediate stopping position is disposed so as to be movable independently from the piston, and pressing means for causing the pusher to displace to the intermediate stopping position is provided.

8 Claims, 8 Drawing Sheets

(A)

(B)

3-POSITION STOPPING CYLINDER

TECHNICAL FIELD

The present invention relates to a 3-position stopping cylinder having an intermediate stopping position between an advance stroke end and a retreat stroke end.

PRIOR ART

A 3-position stopping cylinder of this kind has been used for rotationally driving a latch key in a load port used in a manufacturing process of semiconductor wafers, for example, as disclosed in JP 2001-2428610A publication.

The 3-position stopping cylinder is constituted as shown in FIG. 14. That is, the cylinder comprises a piston 2 and a piston rod 3 which can freely advance and retreat in the interior of the cylinder tube 1, a spring receiving member 4 which is movably attached on the piston rod 3, a stopper 5 and a cylinder cover 6 which restricts movement of the spring receiving member 4 in one direction, a first spring 7 which is provided between the spring receiving member 4 and the piston 2, a recessed portion 3a which is formed at one end of the piston rod 3, and a stop pin 9 which is biased by a second spring 8 in a direction in which it is engaged with the recessed portion 3a.

When the first port 11 is set in a high pressure and the second port 12 is set in a low pressure, the piston 2 moves to the retreat stroke end and the spring receiving member 4 abuts on the cylinder cover 6 so that the first spring 7 is compressed. In this state, when the first port 11 is changed to a low pressure, the piston rod 3 is advanced by the first spring 7 so that the stop pin 9 stops at an intermediate position where it is engaged with the recessed portion 3a. In this state, further, when the second port 12 is changed to a high pressure, the stop pin 9 retreats due to fluid pressure to be disengaged from the recessed portion 3a, so that the piston rod 3 moves to the advance stroke end.

In such a conventional 3-position stopping cylinder, since the stop pin 9 which has been biased by the second spring 8 is provided at the cylinder tube 1 side and the recessed portion 3a is provided at the piston rod 3 side in order to stop the piston rod 3 at the intermediate position, it is inevitable that the structure of the cylinder is complicated and the cylinder is large-sized in an axial direction and in a diametrical direction thereof.

Also, when the piston rod 3 is advanced from the intermediate stopping position, both the ports 11, 12 must once be pressurized for disengaging the stop pin 9 securely, and therefore it is necessary to conduct pressurization and exhaust of both the ports. For this reason, such a problem cannot be accommodated by one 3-position valve and it is necessary to provide two 2-position 3-port valves.

DISCLOSURE OF THE INVENTION

A technical object of the present invention is to provide a 3-position stopping cylinder where a piston rod can be stopped at an intermediate position with a simple mechanism without providing the stop pin or the recessed portion required conventionally.

Another technical object of the present invention is to provide a 3-position stopping cylinder apparatus where the 3-position stopping cylinder is constituted so as to be able to stop at three positions using a single switching valve.

In order to solve the above-described problem, according to the present invention, there is provided a 3-position stopping cylinder, comprising: a hollow cylinder main body which has a head side end wall and a rod side end wall at its both ends; a main piston which is disposed in the interior of the cylinder main body slidably in an axial direction thereof and where a rod side pressure receiving face to which a piston rod is attached and a head side pressure receiving face opposed thereto are different in pressure receiving area from each other; a head side pressure chamber and a rod side pressure chamber which are formed on both sides of the main piston; a pusher which is disposed in the interior of the cylinder main body at a position closer to the head side end wall or the rod side end wall rather than the main piston so as to be movable in the axial direction independently from the main piston and which has a stroke shorter than that of the main piston and serves as both means for pushing the main piston from an stroke end back to an intermediate stopping position and means for stopping the main piston at the intermediate stopping position; and pressing means for causing the pusher to displace up to the intermediate stopping position.

In the 3-position stopping cylinder having the above-described constitution, the piston advances and retreats by alternately supplying pressure fluid to both the pressure chambers on the head side and the rod side. Then, when pressure fluids with the same pressure are simultaneously supplied to both the pressure chambers in a state that the piston stops at a stroke end on the side where the pusher has been provided, the piston moves towards the intermediate stopping position because the composite force of a fluid pressure acting force and an acting force due to the pusher is larger than a fluid pressure acting force acting on the pressure receiving face on the opposite side. When the piston moves up to this intermediate stopping position, the pusher stops at that position, so that the acting force from the pusher does not act on the piston and only fluid pressure acting forces acting on the pressure receiving faces on both the sides acts on the piston. For this reason, the piston is put in a state that it has been pressed on the pusher due to a difference between the fluid pressure acting forces based on an area difference between the pressure receiving faces on the both sides, and it stops at the intermediate stopping position.

Thus, according to the present invention, the cylinder can be stopped at the three positions with a simple mechanism utilizing the pressure receiving area difference between the both faces of the piston and the pusher, and it is unnecessary to provide a stop pin or a recessed portion which is required conventionally.

In the present invention, the pressure receiving areas of both the faces of the main piston are constituted such that the pressure receiving area on a pusher-providing side is kept small and the pressure receiving area on the opposite side thereto is kept large while the main piston is positioned in a stroke range of at least the stroke end on the pusher-providing side to the intermediate stopping position of the whole stroke.

Also, according to one specific constitution aspect of the present invention, the pusher is formed in a hollow sleeve shape and the pressing means is a spring; and the pusher is disposed in the interior of the cylinder main body at a position closer to the rod side end wall rather than the main piston in a state that the pusher has been supported through an outer periphery thereof to an annular guide portion provided to the cylinder main body, the piston rod penetrates the interior of the pusher, a distal end portion of the pusher projects into the rod side pressure chamber and a rear end portion thereof abuts on the spring, and the pusher has a stopper engaged with the guide portion at a position of an advanced end thereof.

According to anther specific constitution aspect of the present invention, the pusher is formed in a short shaft shape and the pressing means is a spring; the pusher is disposed in a receiving chamber positioned at a position closer to the head side end wall rather than the main piston in the interior of the cylinder main body and is biased towards the main piston by the spring; the main piston has a shaft portion extending from an end face thereof on the head side into the receiving chamber in a sealed state to abut on the pusher, and the shaft portion has a diameter larger than that of the piston rod.

According to still another specific constitution aspect of the present invention, the pusher is provided with an annular auxiliary piston portion and a hollow auxiliary rod portion extending from the auxiliary piston portion, and the pressing means is pressure fluid; the cylinder main body has a auxiliary piston chamber formed at a position adjacent to the rod side pressure chamber via an annular partition wall, the auxiliary piston portion of the pusher is slidably received in the auxiliary piston chamber, the auxiliary rod portion is slidably supported to the partition wall via an outer periphery thereof to extend into the rod side pressure chamber, the piston rod penetrates these auxiliary piston portion and the interior of the auxiliary rod portion, and an auxiliary pressure chamber for supplying the pressure fluid is formed on one side of the auxiliary piston portion.

The rod side pressure chamber and the auxiliary pressure chamber mutually communicate with each other via a passage provided inside or outside the cylinder main body.

According to still another specific constitution aspect of the present invention, the pusher is formed in a piston shape, the pressing means is a pressure fluid, the pusher is disposed in the interior of the cylinder main body so as to be slidable in a sealed state in a auxiliary piston chamber provided at a position closer to the head side end wall rather than the main piston, an auxiliary pressure chamber for supplying the pressure fluid is formed on one side of the pusher, the main piston has a shaft portion extending from an end face of the head side towards the pusher in a sealed state, and the shaft portion has a diameter larger than that of the piston rod.

According to still another specific embodiment of the present invention, the cylinder main body has an auxiliary piston chamber formed at adjacent to the head side pressure chamber and a sliding hole connecting the head side pressure chamber and the auxiliary piston chamber, the pusher is formed in a piston shape and is disposed in the auxiliary piston chamber so as to be slidable in a sealed state, a rod portion which extends towards the main piston and which is fitted into the sliding hole in a sealed state at an advance stroke end of the pusher is provided one side of the pusher, an auxiliary pressure chamber in which pressure fluid which is the pressing means is formed on the other side of the pusher, the main piston has an shaft portion opposed to the rod portion on its end face on the head side, and the shaft portion has a diameter larger than that of the piston rod and has a length where the shaft portion can be fitted in the sliding hole in a sealed state only when the main piston is positioned in a stroke range from the retreat stroke end to the intermediate stopping position.

Also, according to the present invention, a 3-position stopping cylinder apparatus is constituted by connecting the above-described 3-position stopping cylinder to a common pressure fluid source via a switching valve of a single 3-position pressure center type.

DETAILED DESCRIPTION

Figure 1:
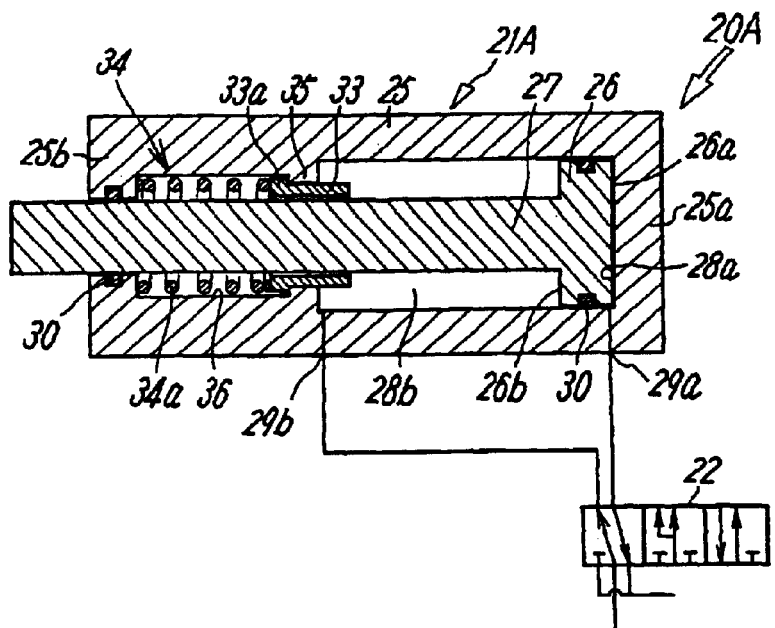
FIG. 1 is a sectional view showing a first embodiment of the present invention.

FIG. 1 shows a first embodiment of a 3-position stopping cylinder apparatus according to the present invention, and this cylinder apparatus 20A is constituted by connecting a 3-position stopping cylinder 21A to a common pressure fluid source 23 via a switching valve 22 of a single 3-position pressure center type.

The 3-position stopping cylinder 21A comprises a hollow cylinder main body 25 having both ends closed by a head side end wall 25a and a rod side end wall 25b, a main piston 26 disposed in the interior of the cylinder main body 25 so as to be slidable in an axial direction thereof, a piston rod 27 penetrating the rod side end wall 25b from one end side of the main piston 26 in a sealed state to extend outside, a head side pressure chamber 28a and a rod side pressure chamber 28b formed on both sides of the main piston 26, and two ports 29a, 29b communicating with these pressure chambers 28a, 28b individually. In the main piston 26, pressure receiving areas H, R of a pressure receiving face 26a on the head side and a pressure receiving face 26b on the rod side are different from each other, and the pressure receiving area H on the head side is formed so as to be larger than the pressure receiving area R on the rod side. In the figure, reference numeral 30 denotes a sealing member.

A pusher 33 serving as both means for pushing the main piston 26 from the stroke end back to the intermediate stopping position and means for stopping the main piston 26 at the intermediate position and pressing means 34 for causing the pusher 33 to displace up to the intermediate stopping position are provided at a position closer to the rod side end wall 25b rather than the main piston 26 in the interior of the cylinder main body 25. The pusher 33 is formed in a hollow sleeve shape, and an outer peripheral face thereof is supported by an annular guide portion 35 formed at a position adjacent to the rod side pressure chamber 28b so that the pusher 33 is made movable in an axial direction of the cylinder main body 25 independently from the main piston 26 and the piston rod 27 penetrates the interior of the pusher 33. A distal end portion of the pusher 33 projects into the rod side pressure chamber 28b, a rear end portion thereof is positioned in a spring chamber 36, and a spring 34a constituting the pressing means 34 abuts on the rear end portion. Also, a stopper 33a engaged with the guide portion 35 at a position of an advance end of the pusher is provided at the rear end portion of the pusher 33, and the stroke of the pusher 33 is set to be shorter than the main piston 26 by this stopper 33a.

A biasing force F of the spring 34a, and fluid pressure acting forces HP, RP acting on pressure receiving faces 26a, 26b of the main piston 26 on the head side and the rod side are related to each other so as to meet the relationship of (H−R) P<F<HP.

The switching valve 22 has a first switching position and a second switching position on both the sides, and an intermediate third switching position therebetween. In the first and second switching positions, the head side pressure chamber 28a and the rod side pressure chamber 28b of the cylinder 21A are selectively connected to the pressure fluid source 23, and the both pressure chambers 28a, 28b are simultaneously connected to the pressure fluid source in the intermediate third switching position.

In the cylinder apparatus 20A having the above-described constitution, as shown in FIG. 1, the switching valve 22 is switched to the first switching position on the left side so that the head side pressure chamber 28a of the 3-position stopping cylinder 21A is opened to the atmosphere, and when fluid pressure is supplied to the rod side pressure chamber 28b, the main piston 26 and the piston rod 27 retreats up to the stroke end on the head side. At this time, the pusher 33 is pushed by the spring 34a to advance, so that the distal end thereof protrudes in the rod side pressure chamber 28b and the stopper 33a of the rear end thereof occupies the position of the advanced end engaged with the guide portion 35.

Figure 2:
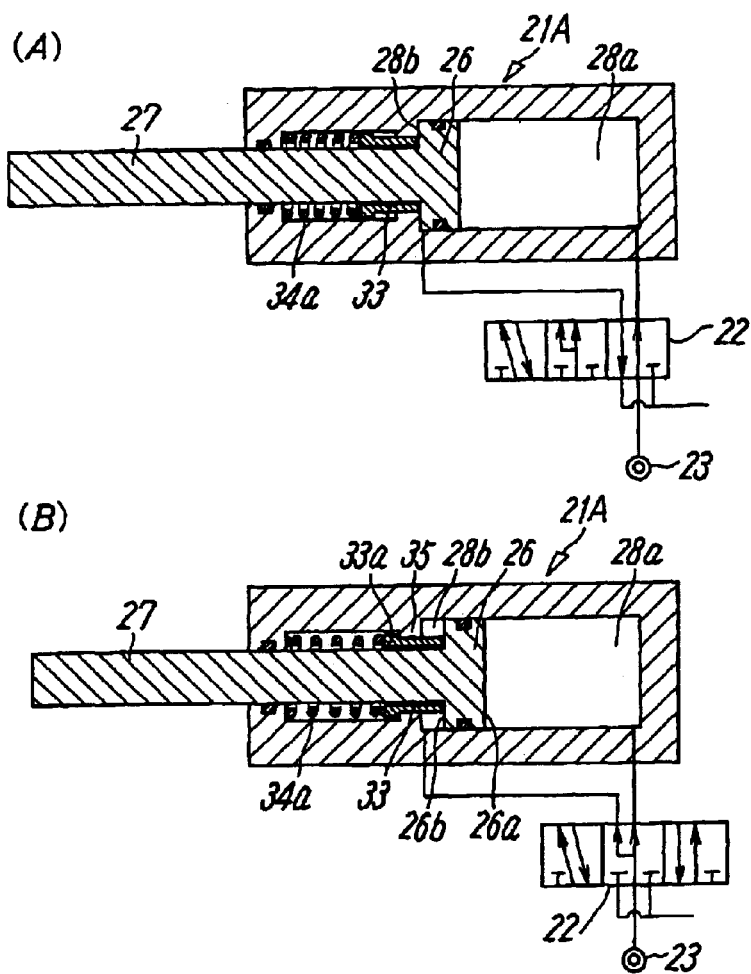
FIGS. 2(A) and 2(B) are sectional views showing operation states different from an operation state in FIG. 1.

As shown in FIG. 2(A), the switching valve 22 is switched from the above-described state to the second switching position on the left side to open the rod side pressure chamber 28b to the atmosphere and supply pressure fluid to the head side pressure chamber 28a, the main piston 26 and the piston rod 27 advances up to the stroke end on the rod side. At this time, the pusher 33 is pressed by the main piston 26 to retreat, thereby compressing the spring 34a.

As shown in FIG. 2(B), when the switching valve 22 is switched from the this state to the intermediate third switching position to supply pressure fluids with the same pressure to both the rod side pressure chamber 28b and the head side pressure chamber 28a simultaneously, the main piston 26 and the pusher 33 move towards the head side because the composite force of a fluid pressure acting force RP acting on the rod side pressure receiving face 26b of the main piston 26 and a biasing force F of the spring 34a pressing the pusher 33 is larger than a fluid pressure acting force HP acting on the head side pressure receiving face 26a. When the main piston and the pusher has moved up to the intermediate position, the stopper 33a of the pusher 33 is engaged with the guide portion 35 so that the pusher 33 stops at this position. Therefore, the acting force F provided by the pusher 33 is not applied to the main piston 26, and the fluid pressure acting forces HP and RP acting on the pressure receiving faces 26a, 26b on the both sides are applied to the main piston 26. For this reason, the main piston 26 is pressed to the rod side due to a difference between the fluid pressure acting forces based upon the pressure receiving area difference, and stops at the position in a state that it has been pressed on the pusher 33. At this time, the pusher 33 functions as means for stopping the main piston 26 at the intermediate position.

As described above, the order of switching the piston rod 27 to the three positions can freely be determined according to an application of the cylinder apparatus.

Thus, according to the present invention, the piston rod 27 can be stopped at three positions by a simple mechanism utilizing the pressure receiving area difference between the both faces of the main piston 26 and the pushing force of the pusher 3, and it is unnecessary to provide a stop pin or a recessed portion like the conventional art.

Figure 3:
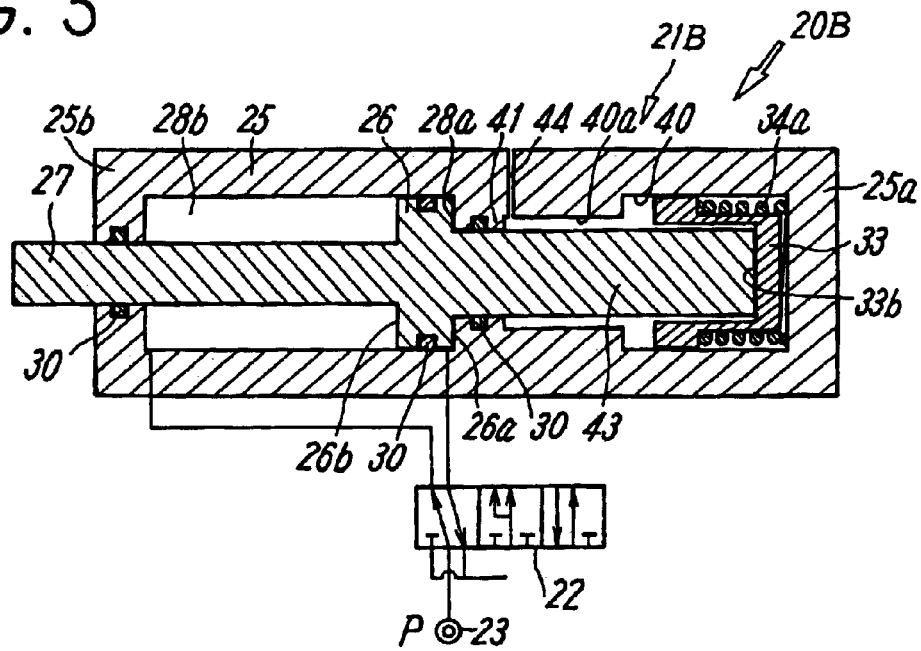
FIG. 3 is a sectional view showing a second embodiment of the present invention.

FIG. 3 shows a second embodiment of a cylinder apparatus according to the present invention, and the cylinder apparatus 20B is different from the first embodiment in that a pusher 33 in a 3-position stopping cylinder 21B is provided on the head side of the cylinder main body 25.

That is, a receiving chamber 40 is formed in the interior of the cylinder main body 25 at a position close to the head side end wall 25a rather than the main piston 26 so as to be adjacent to the head side pressure chamber 28a via a partition wall 41, and the pusher 33 is received in the receiving chamber 40. The pusher 33 is formed in a short shaft shape and has a recessed portion 33b at its front face central portion, and it is biased from its back face side towards the main piston 26 side by a spring 34a.

Also, the main piston 26 is provided at an end face on its head side with a shaft portion 43, the shaft portion 43 slidably penetrates the partition wall 41 in a sealed state to extend into the receiving chamber 40, and its distal end abuts on the pusher 33 in the recessed portion 33b. This shaft portion 43 is formed so as to have a diameter larger than that of the piston rod 27, so that a pressure receiving area H of the head side pressure receiving face 26a of the main piston 26 is set to be smaller than a pressure receiving area R of the rod side receiving face 26b. Such a constitution is employed that the receiving chamber 40 is opened from a small diameter portion 40a to the outside via a vent hole 44 provided in the cylinder main body 25 so that movement of the pusher 33 and the shaft portion 43 are not blocked.

A biasing force F of the spring 34a, and fluid pressure acting forces HP, RP acting on the head side and rod side receiving faces 26a, 26b of the main piston 26 are related to each other so as to meet the relationship of (R−H) P<F<RP.

Since the other constitutions of the 3-position stopping cylinder 21B except for the above are substantially the same as those of the 3-position stopping cylinder 21A of the first embodiment, these main same constitution portions are attached with same reference numerals in the first embodiment and explanation thereof will be omitted.

In the cylinder apparatus 20B having the above-described constitution, as shown in FIG. 3, when the switching valve 22 is switched to the first switching position on the left side to open the head side pressure chamber 28a of the 3-position stopping cylinder 21B to the atmosphere and supply pressure fluid to the rod side pressure chamber 28b, the main piston 26 and the piston rod 27 retreats to the stroke end on the head side. At this time, the pusher 33 is pushed by the shaft portion 43 to retreat, thereby compressing the spring 34a.

Figure 4:
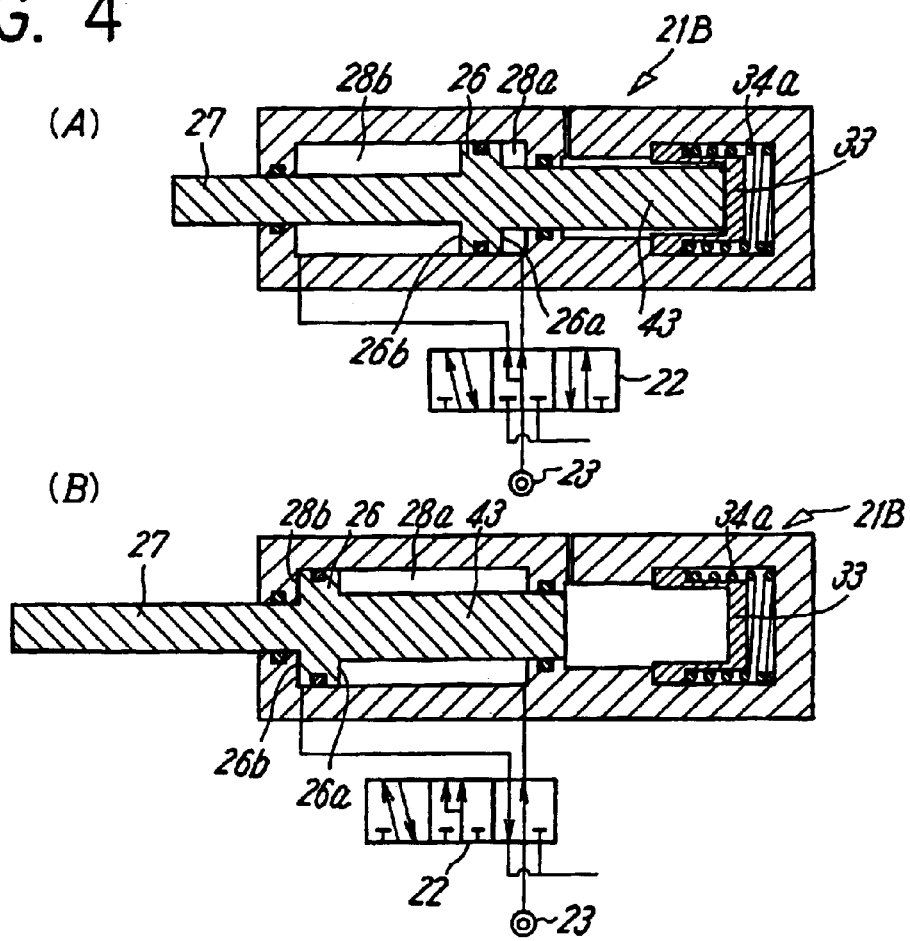
FIGS. 4(A) and 4(B) are sectional views showing operation states different from an operation state in FIG. 3.

As shown in FIG. 4(A), when the switching valve 22 is switched from this state to the intermediate third switching position to supply pressure fluids with the same pressure to both the rod side pressure chamber 28b and the head side pressure chamber 28a, the main piston 26 advances to the rod side because a composite force of a fluid pressure acting force HP acting on the pressure receiving face 26a on the head side and a biasing force F of the spring 34a pressing the pusher 33 is larger than a fluid pressure acting force RP acting on the pressure receiving face 26b on the rod side. When the main piston 26 advances to the intermediate stopping position, the pusher 33 stops at an advanced end and a pushing force of the pusher 33 is not applied to the main piston 26, so that only the fluid pressure acting forces HP, RP acting on the pressure receiving faces 26a, 26b on the both sides are applied to the main piston 26. For this time, the main piston 26 is pressed to the head side due to a fluid pressure acting force difference based on a pressure receiving area difference and the piston stops at the position in a state that the shaft portion 43 has been pressed on the pusher 33.

As shown in FIG. 4(B), the switching valve 22 is switched from the above-described state to the second switching position on the right side to open the rod side pressure chamber 28b to the atmosphere and supply fluid pressure to the head side pressure chamber 28a, the main piston 26 and the piston rod 27 advance to the stroke end on the rod side.

Figure 5:
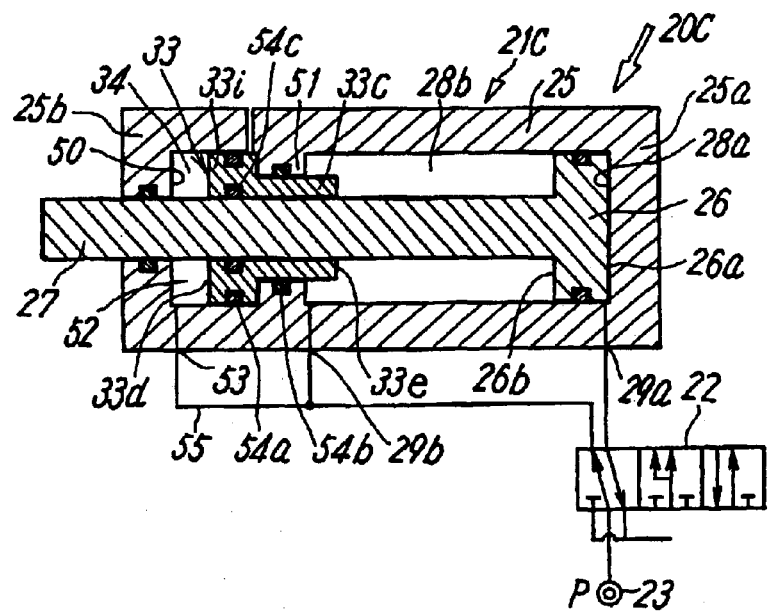
FIG. 5 is a sectional view showing a third embodiment of the present invention.

FIG. 5 shows a third embodiment of a cylinder apparatus according to the present invention, and this cylinder apparatus 20C is different from the first embodiment in that the pusher 33 in the 3-position stopping cylinder 21C is formed in a piston shape and the pressing means 34 is pressure fluid.

That is, the pusher 33 is provided with an annular auxiliary piston portion 33i and a hollow auxiliary rod portion 33c extending from the auxiliary piston portion 33i. On the other hand, an auxiliary piston chamber 50 is formed in the cylinder main body 25 at a position adjacent to the rod side pressure chamber 28b via a partition wall 51, the auxiliary piston portion 33i is slidably received in the auxiliary piston chamber 50 to via the sealing member 54a, and the auxiliary rod portion 33c slidably penetrates the partition wall 51 via a sealing member 54b to project to the rod side pressure chamber 28b. The piston rod 27 slidably penetrates the auxiliary piston rod 33i and the interiors of the auxiliary rod portion 33c via a sealing member 54c. Also, an auxiliary pressure chamber 52 is formed on a back side of the pusher 33, and the auxiliary pressure chamber 52 communicates with an auxiliary port 53 provided in the cylinder main body 25.

Pressure receiving areas H, R of respective pressure receiving faces 26a, 26b of the main piston 26 on the head side and the rod side, a pressure receiving area D of a pressure receiving face 33d on a back face of the auxiliary piston portion 33i in the pusher 33, and a pressure receiving area E of a pressure receiving face 33e at a distal end of the auxiliary rod portion 33c are related to one anther so as to meet (H−R)<(D−E).

Since the other constitutions of the 3-position stopping cylinder 21c except for the above are substantially the same as the 3-position stopping cylinder 21A in the first embodiment, these main same constitution portions are attached with same reference numerals in the first embodiment and explanation thereof will be omitted.

The 3-position stopping cylinder 21C is connected to the switching valve 22 in a state that the rod side pressure chamber 28b and the auxiliary pressure chamber 52 have been caused to communicate with each other via a passage 55 comprising an external piping. As shown in FIG. 5, when the switching valve 22 is switched to the first switching position on the left side to open the head side pressure chamber 28a to the atmosphere and supply pressure fluids to the rod side pressure chamber 28b and the auxiliary pressure chamber 52, the main piston 26 and the piston rod 27 retreat to the stroke end on the head side and the pusher 33 moves to a position of the advanced end.

Figure 6:
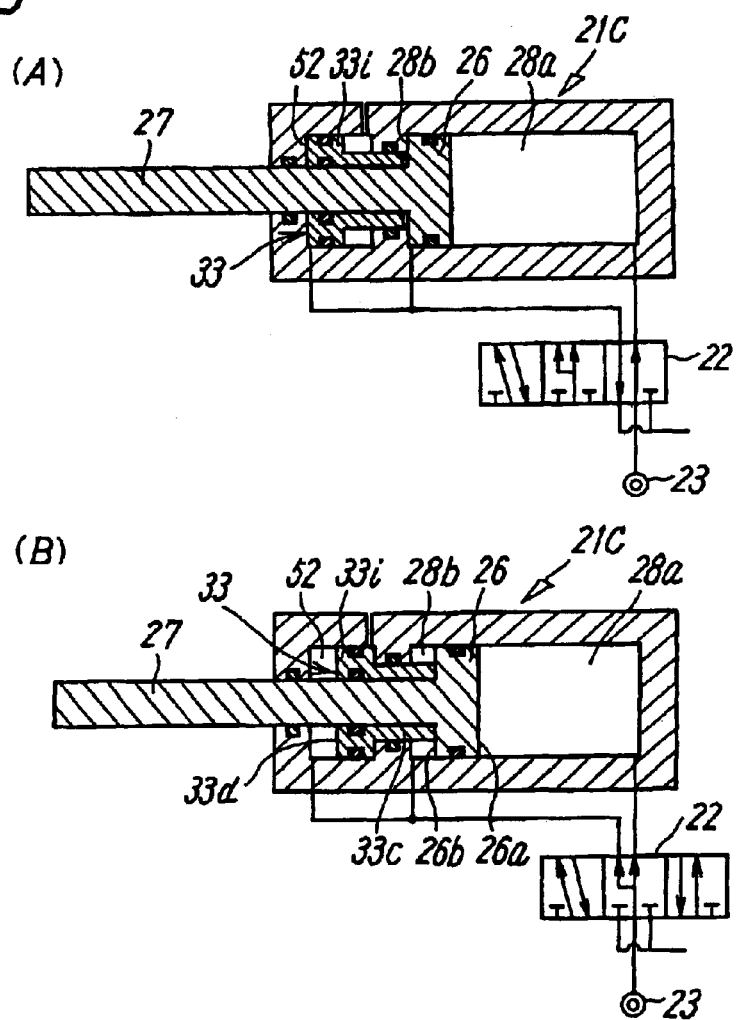
FIGS. 6(A) and 6(B) are sectional views showing operation states different from an operation state in FIG. 5.

As shown in FIG. 6(A), when the switching valve 22 is switched from this state to the second switching position to open the rod side pressure chamber 28b and the auxiliary pressure chamber 52 to the atmosphere and supply pressure fluid to the head side pressure chamber 28a, the main piston 26 and the piston rod 27 advances to the stroke end on the rod side.

As shown in FIG. 6(B), when pressure fluids with the same pressure are simultaneously supplied to both of the rod side pressure chamber 28b and the auxiliary pressure chamber 52, and the head side pressure chamber 28a from the above-described state, the main piston 26 and the pusher 33 retreats towards the head side because a composite force of a fluid pressure acting force RP acting on the rod side pressure receiving face 26b of the main piston 26 and a fluid pressure acting force DP acting on the pressure receiving face 33d of the pusher 33 is larger than a fluid pressure acting force HP acting on the head side pressure receiving face 26a. When the piston and the piston rod moves to the intermediate stopping position, the pusher 33 stops at the advanced end, and a pushing force of the pusher 33 is not applied to the main piston 26 so that only the fluid pressure acting forces HP, RP acting on the pressure receiving faces 26a, 26b on the both sides of the main piston are applied to the main piston 26. For this reason, the main piston 26 is pushed to the rod side due to a difference between fluid pressure acting forces based on a pressure receiving area difference and stops at that position in a state that it has been pressed on the auxiliary rod portion 33c of the pusher 33.

Figure 7:
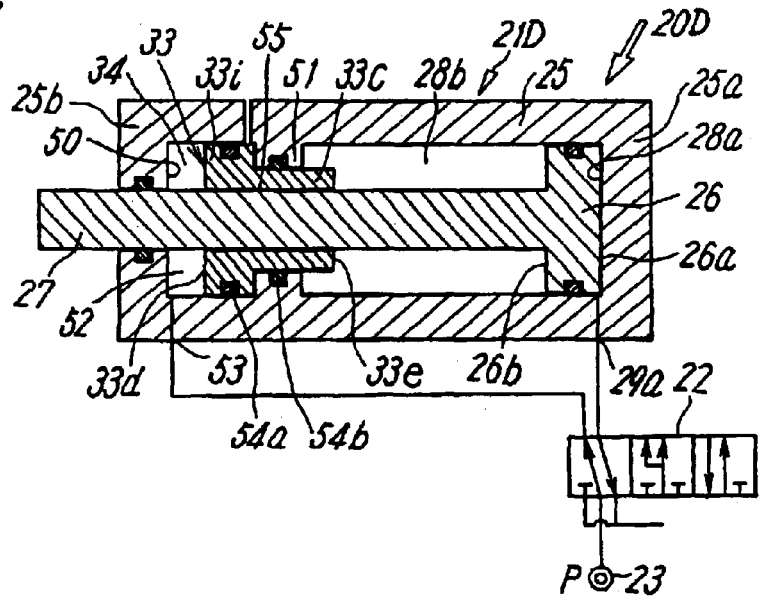
FIG. 7 is a sectional view showing a fourth embodiment of the present invention.
Figure 8:
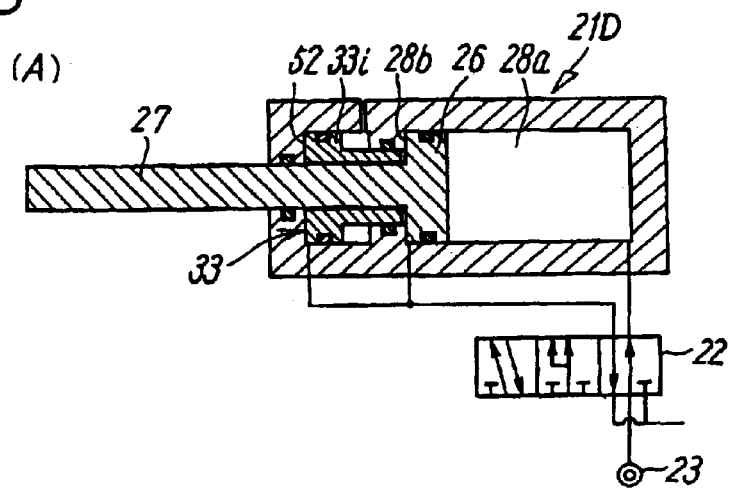
FIGS. 8(A) and 8(B) are sectional views showing operation states different from an operation state in FIG. 7.
Figure 8:
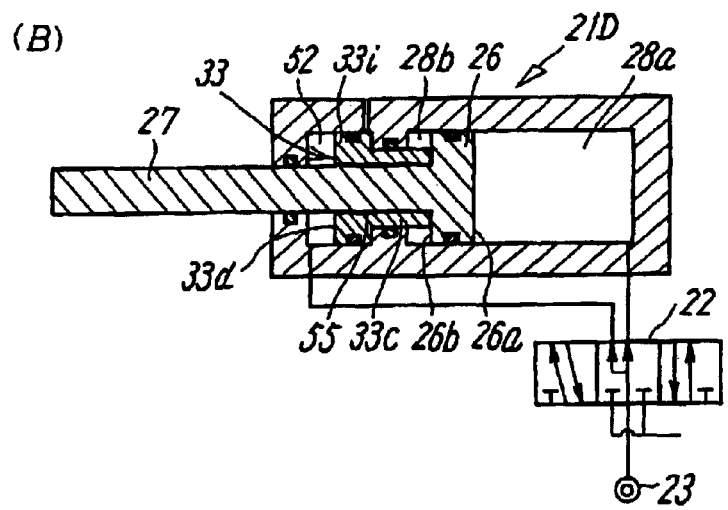

FIG. 7 and FIGS. 8(A) and 8(B) show a fourth embodiment of a cylinder apparatus according to the present invention, and a point that the cylinder apparatus 20D is different from the cylinder apparatus 20C of the above third embodiment lies in a point that the rod side pressure chamber 28b and the auxiliary pressure chamber 52 are put in a completely fluidly isolated state from each other by providing a sealing member 54c between the pusher 33 and the piston rod 27 and they are caused to communicate with each other via an external piping in the third embodiment, but the rod side pressure chamber 28b and the auxiliary pressure chamber 52 is caused to communicate with each other via a passage 55 provided in the interior of the 3-position stopping cylinder 21D in the cylinder apparatus 20D of the fourth embodiment. That is, a passage 55 comprising a gap is formed between an inner periphery of the pusher 33 and an outer periphery of the piston rod 27 without providing such a sealing member 54c as the third embodiment therebetween, and the rod side pressure chamber 28b and the auxiliary pressure chamber 52 communicate with each other via this passage 55. Accordingly, it is unnecessary to provide respective ports in the rod side pressure chamber 28b and the auxiliary pressure chamber 52 individually, and a port 53 can be provided in either one thereof, for example, in the auxiliary pressure chamber 52.

Incidentally, since the other constitutions and effects of the cylinder apparatus 20D except for the above are substantially the same as those of the cylinder apparatus 20C of the third embodiment, same constitution portions are attached with same reference numerals and explanation thereof will be omitted.

Figure 9:
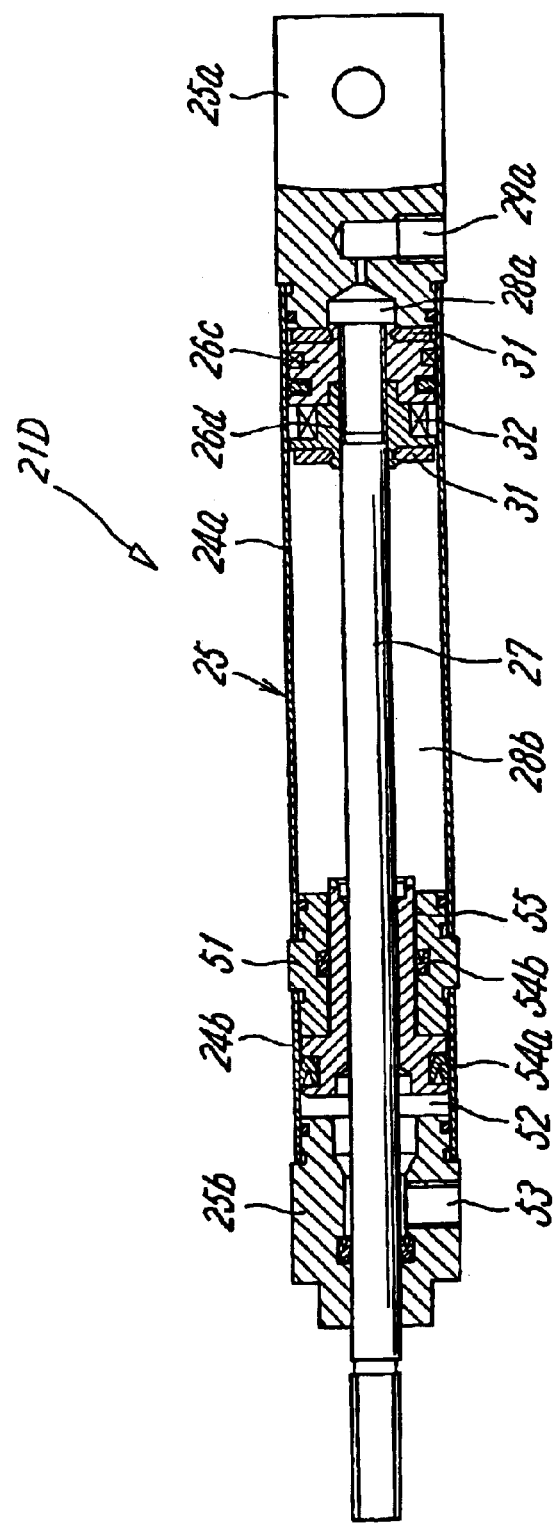
FIG. 9 is a sectional view showing a specific constitution of a 3-position stopping cylinder in the fourth embodiment.

FIG. 9 shows a specific structure example of a 3-position stopping cylinder 21D in the cylinder apparatus 20D of the fourth embodiment. A cylinder main body 25 of this cylinder 21D comprises two cylindrical members 24a, 24b, these cylindrical members 24a, 24b are respectively attached to both end portions of a cylindrical partition wall 51, and a head side end wall 25a and a rod side end wall 25b are respectively fitted into both end portions of the cylinder main body 25. Also, the piston 26 is formed by screw annular first member 26c and second member 26d to a distal end portion of the piston rod 27, cushion members 31 are provided at front and rear both end portions of the piston 26 for relaxing impacts at the stroke ends, and a permanent magnet 32 which serves as a body to be detected for position detection is attached between the both members 26c, 26d. The other constitutions of the cylinder 21D are the same as those in FIG. 7.

Figure 10:
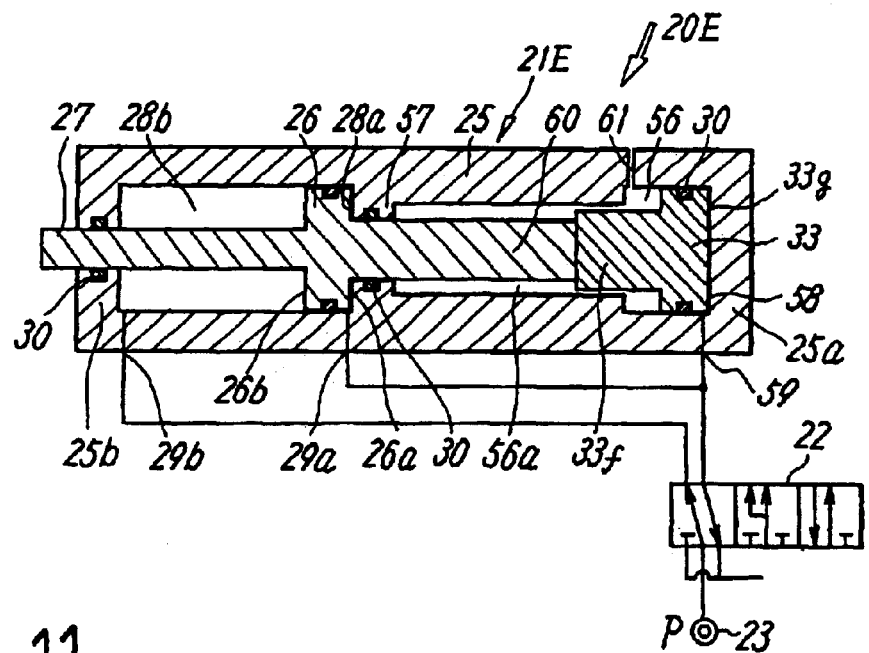
FIG. 10 is a sectional view showing a fifth embodiment of the present invention.

FIG. 10 shows a fifth embodiment of a cylinder apparatus according to the present invention, and this cylinder apparatus 20E is different from the above-described third embodiment in that a pusher 33 in a 3-position stopping cylinder 21E is provided at a portion of the cylinder main body 25 on the head side thereof.

That is, an auxiliary piston chamber 56 is formed in the interior of the cylinder main body 25 at a position adjacent to the head side pressure chamber 28a via a partition wall 57, and the piston-like pusher 33 is received in the auxiliary piston chamber 56 so as to be slidable in a sealed state. An auxiliary pressure chamber 58 is formed on a back face of the pusher 33, and the auxiliary pressure chamber 58 communicates with an auxiliary port 59 provided in the cylinder main body 25.

Also, the main piston 26 is provided at its end face on the head side with a shaft portion 60, this shaft portion 60 slidably penetrates the partition wall 57 in a sealed state to extend into a small diameter space portion 56a communicating with the auxiliary piston chamber 56, and a distal end thereof abuts on a front face of a small diameter portion 33f of the pusher 33. This shaft portion 60 is formed so as to have a diameter larger than that of the piston rod 27, so that a pressure receiving area H of the head side pressure receiving face 26a of the main piston 26 is set to be smaller than a pressure receiving area R of the rod side pressure receiving face 26b. Such a constitution is employed that the space portion 56a is opened to the outside via a vent hole 61 provided in the cylinder main body 25 so that movement of the pusher 33 and the shaft portion 60 are not blocked.

Pressure receiving areas H, R of the pressure receiving faces 26a, 26b of the main piston 26 on the head side and rod side, and a pressure receiving area G of the pressure receiving face 33g of the pusher 33 are related to each other so as to meet (R−H)<G.

Since the other constitutions of the 3-position stopping cylinder 21E except for the above are substantially the same as those of the 3-position stopping cylinder 21C in the third embodiment, these main same constitution portions are attached with same reference numerals in the first embodiment and explanation thereof will be omitted.

In the cylinder apparatus 20E having the above-described constitution, as shown in FIG. 10, when the switching valve 22 is switched to the first switching position on the left side to open the head side pressure chamber 28a and the auxiliary pressure chamber 58 of the 3-position stopping cylinder 21E to the atmosphere and supply pressure fluid to the rod side pressure chamber 28b, the main piston 26 and the piston rod 27 retreat to the stroke end on the head side, and the pusher 33 is pressed by the shaft portion 60 to retreat.

Figure 11:
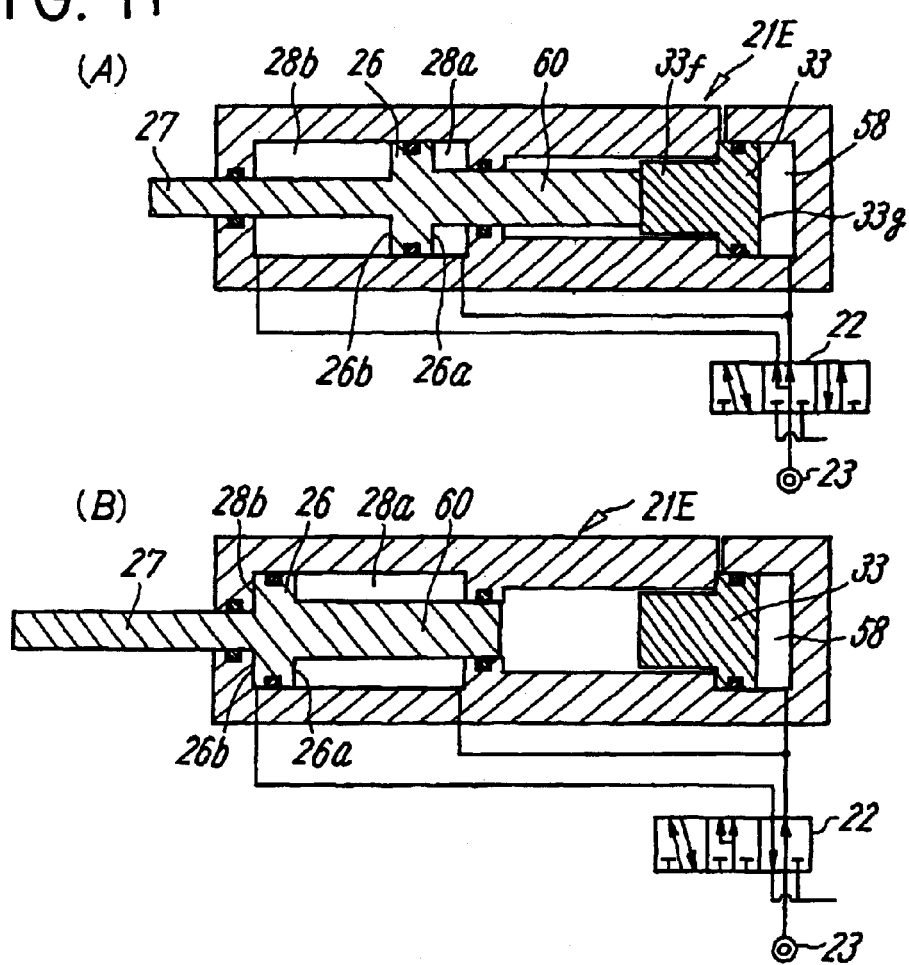
FIGS. 11(A) and 11(B) are sectional views showing operation states different from an operation state in FIG. 10.

As shown in FIG. 11(A), when the switching valve 22 is switched from this state to the intermediate third switching position to simultaneously supply pressure fluids with the same pressure to the head side pressure chamber 28a and the auxiliary pressure chamber 58, and the rod side pressure chamber 28b, the main piston 26 and the pusher 33 advances to the rod side because a composite force of a fluid pressure acting force HP acting on a head side pressure receiving face 26a of the main piston 26 and a fluid pressure acting force GP acting on a pressure receiving face 33g of the pusher 33 is larger than a fluid pressure acting force RP acting on a rod side pressure receiving face 26b. When the main piston and the pusher moves to the intermediate stopping position, the pusher 33 stops at its advanced end and a pushing force of the pusher 33 is not applied to the main piston 26, so that only the fluid pressure acting forces HP, RP is applied to the pressure receiving faces 26a, 26b on the both sides of the main piston 26. For this reason, the main piston 26 is pushed to the head side due to a fluid pressure acting force difference based upon a pressure receiving area difference and stops at that position in a state that it has been pressed on the pusher 33.

As shown in FIG. 11(B), when the switching valve 22 is switched from the above-described state to the second switching position on the right side to open the rod side pressure chamber 28b to the atmosphere and supply pressure fluids to the head side pressure chamber 28a and the auxiliary pressure chamber 58, the main piston 26 and the piston rod 27 advance to the stroke end on the rod side.

Figure 12:
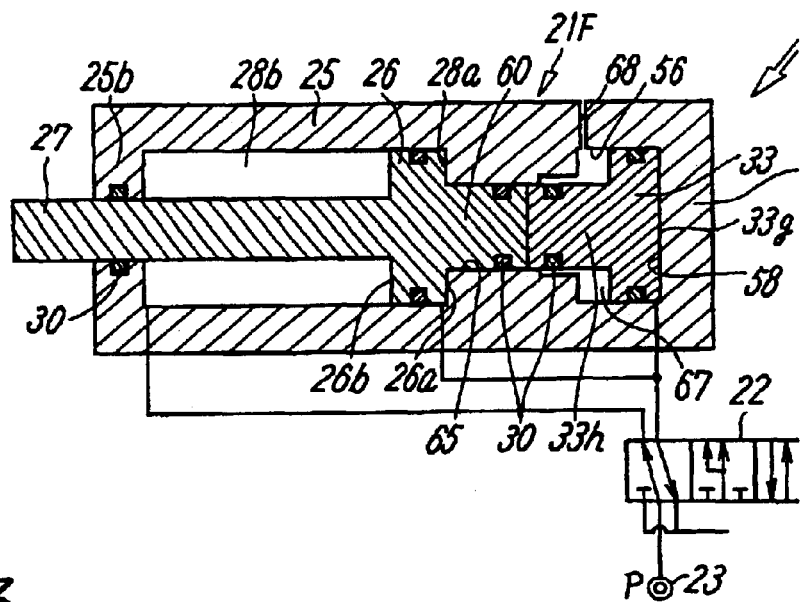
FIG. 12 is a sectional view showing a sixth embodiment of the present invention.

FIG. 12 shows a sixth embodiment of a cylinder apparatus according to the present invention, and a point that the cylinder apparatus 20F is different from the above-described fourth embodiment lies in a point that a shaft portion 60 in a 3-position stopping cylinder 21F is formed in a small size so that an axial length of the cylinder has been shortened. That is, an auxiliary piston chamber 56 is formed in the cylinder main body 25 at a position adjacent to a head side pressure chamber 28a via a small diameter sliding hole 65, and the pusher 33 is provided in the auxiliary piston chamber 56 slidably in a sealed state. A small diameter rod portion 33h extending towards the main piston 26 side is provided at one side of the pusher 33 so as to be fitted in the sliding hole 65 at a position of the advanced stroke end of the pusher 33 slidably in a sealed state, and an auxiliary pressure chamber 58 is formed at the other side of the pusher 33.

Also, the main piston 26 is provided at an end face on the head side with the shaft portion 60 opposed to the rod portion 33h, and this shaft portion 60 has a diameter larger than that of the piston rod 27 and is formed in such a length that the main piston can be fitted into the sliding hole 65 in a sealed state while the main piston 26 is positioned in a stroke range from a retreated end to the intermediate stopping position. In the figure, reference numeral 68 denotes a breather hole for opening a chamber 67 on the rod portion 33h side of the pusher 33 to the outside.

Pressure receiving areas H, R of pressure receiving faces 26a, 26b of the main piston 26 on the head side and the rod side, and a pressure receiving area G of a pressure receiving face 33g of the pusher 33 are related to each other so as to meet (R−H)<G.

Since the other constitutions of the 3-position stopping cylinder 21E except for the above are substantially the same as those of the 3-position stopping cylinder 21E in the fourth embodiment, these main same constitution portions are attached with same reference numerals in the first embodiment and explanation thereof will be omitted.

In the cylinder apparatus 20E having the above-described constitution, as shown in FIG. 12, when the switching valve 22 is switched to the first switching position on the left side to open the head side pressure chamber 28a and the auxiliary pressure chamber 58 of the 3-position stopping cylinder 21F to the atmosphere and supply pressure fluid to the rod side pressure chamber 28b, the main piston 26 and the piston rod 27 retreat to the stroke end on the head side, and the pusher 33 also retreats because it is pushed by the shaft portion 60. At this time, the shaft portion 60 of the main piston 26 has been fitted into the sliding hole 65 in a sealed state, but the rod portion 33h of the pusher 33 is put in a non-sealed state when the sealing member 30 is released from the sliding hole 65.

Figure 13:
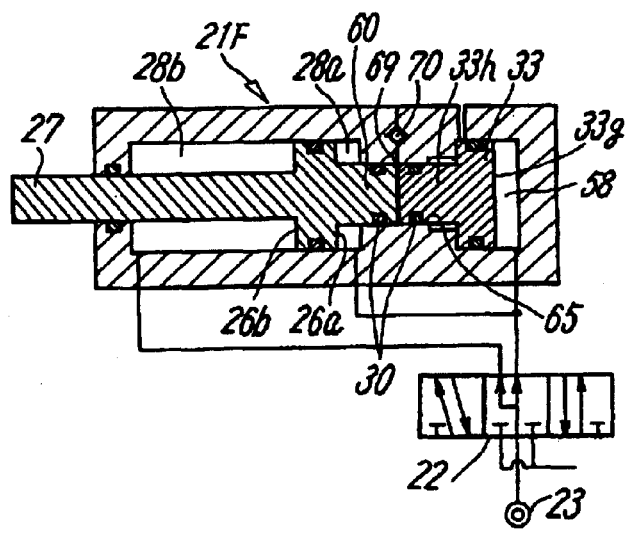
FIGS. 13(A) and 13(B) are sectional views showing operation states different from an operation state in FIG. 12.
Figure 13:
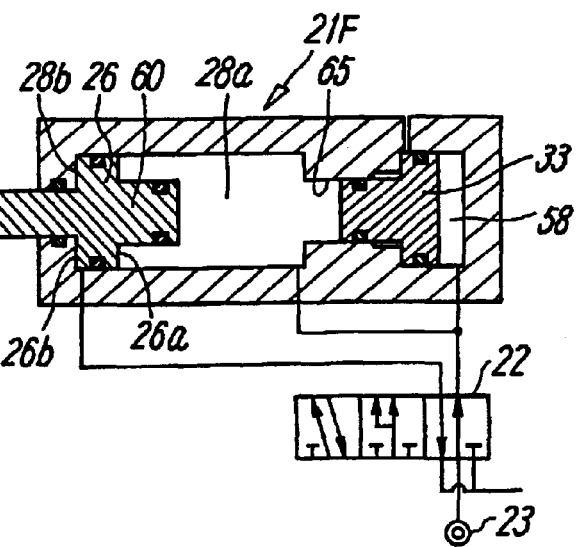
Figure 14:
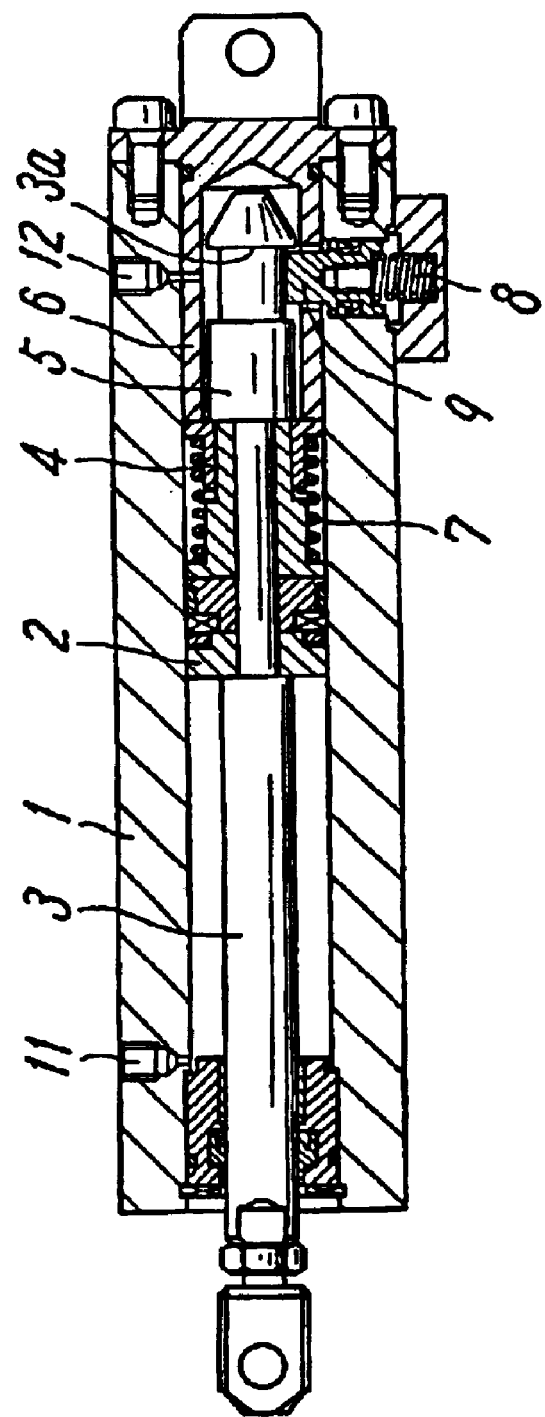
FIG. 14 is a sectional view of a conventional example.

As shown in FIG. 13(A), when the switching valve 22 is switched from this state to the third switching position to simultaneously supply pressure fluids with the same pressure to the head side pressure chamber 28a, and the auxiliary pressure chamber 58 and the rod side pressure chamber 28b, the main piston 26 and the pusher 33 advance towards the rod side because a composite force of a fluid pressure acting force HP acting on the head side pressure receiving face 26a of the main piston 26 and a fluid pressure acting force GP acting on the pressure receiving face 33g of the pusher 33 is larger than a fluid pressure acting force RP acting on the rod side pressure receiving face 26b. When the main piston 26 and the pusher 33 move to the intermediate stopping position, the pusher 33 stops at the advanced end and the pushing force of the pusher 33 is not applied to the main piston 26, so that only the fluid pressure acting forces HP, RP acting on the pressure receiving faces 26a, 26b on both sides of the main piston 26 are applied to the main piston 26. For this reason, the main piston 26 is pushed to the head side due to a difference between the fluid pressure acting forces based on a pressure receiving area difference and it stops in a state that it has been pressed onto the pusher 33. At this time, the shaft portion 60 and the rod portion 33h of the pusher 33 have been put in a sealed state because the sealing member is fitted into the sliding hole 65.

As shown in FIG. 13(B), when the switching valve 22 is switched from the above-described state to the second switching position on the right side to open the rod side pressure chamber 28b to the atmosphere and supply pressure fluid to the head side pressure chamber 28a and the auxiliary pressure chamber 58, the piston 26 and the piston rod 27 advance to the stroke end on the rod side, and the shaft portion 60 with the shorter length goes out of the sliding hole 65 according to the advance.

When the shaft portion 60 goes out of the sliding hole 65 in this manner, fluid pressure also acts on an end face of the shaft portion 60 so that the pressure receiving area of the piston 26 on the head side becomes substantially large. At this time, however, even when the pressure receiving area varies, such a variation does not influence movement of the piston. Briefly speaking, only such a fact is required that, of the pressure receiving faces 26a, 26b of the piston 26 on the both sides thereof, the pressure receiving area H of the pressure receiving face 26a on the side where the pusher 33 has been provided is kept smaller than the pressure receiving area R of the pressure receiving face 26b on the opposed side while the piston rod 27 is positioned in the stroke range of the stroke end at which the pusher 33 has been provided to the intermediate stopping position, thereby allowing stoppage of the piston rod 27 at the intermediate position. In this connection, such a constitution is employed in the above-described first to fourth embodiments that such a size relationship between pressure receiving areas is always maintained.

Incidentally, in the sixth embodiment, as shown in FIG. 13(A), it is preferable for facilitating movement of the shaft portion 60 from the state of the intermediate stopping position that a space portion 69 formed between the shaft portion 60 and the rod portion 33h inside the sliding hole 65 is connected with a check valve 70 for allowing only inflow of air from the outside to the space portion 69.

Also, in the third, fifth and sixth embodiments, the pressure chamber on the side where the pusher has been provided and the auxiliary pressure chamber have been connected to each other by the external piping, but they may be connected by a vent hole provided in the thickness of the cylinder main body.

Further, the 3-position stopping cylinder may be used alone, but such a usage can be applied like a known dual rod type cylinder that two sets of 3-position stopping cylinder mechanisms are incorporated in parallel in the interior of one cylinder main body, corresponding pressure chambers are caused to communicate with each other and two piston rods are coupled to each other to be operated synchronously.

As described in detail, according to the present invention, a 3-position stopping cylinder where a piston can be stopped at three positions with a simple mechanism utilizing a pressure receiving area difference between both faces of the piston and a pusher, and a 3-position stopping cylinder apparatus using the same can be obtained.

What is claimed is:

1. A 3-position stopping cylinder comprising:

a hollow cylinder main body which has a head side end wall and a rod side end wall at its both ends;

a main piston which is disposed in the interior of the cylinder main body slidably in an axial direction thereof and where a rod side pressure receiving face to which a piston rod is attached and a head side pressure receiving face opposed thereto are different in pressure receiving area from each other;

a head side pressure chamber and a rod side pressure chamber which are formed on both sides of the main piston;

a pusher which is disposed in the interior of the cylinder main body at a position closer to the head side end wall or the rod side end wall rather than the main piston so as to be movable in the axial direction independently from the main piston and which has a stroke shorter than that of the main piston and serves as both means for pushing the main piston from a stroke end back to an intermediate stopping position and means for stopping the main piston at the intermediate stopping position; and pressing means for causing the pusher to displace up to the intermediate stopping position, wherein:

the pusher is formed in a hollow sleeve shape and the pressing means is a spring; and the pusher is disposed in the interior of the cylinder main body at a position closer to the rod side end wall rather than the main piston in a state that the pusher has been supported via its outer periphery thereof to an annular guide portion provided to the cylinder main body, the piston rod penetrates the interior of the pusher, a distal end portion of the pusher projects into the rod side pressure chamber and a rear end portion thereof abuts on the spring, and the pusher has a stopper engaged with the guide portion at a position of an advance end thereof.

2. A 3-position stopping cylinder comprising:

a hollow cylinder main body which has a head side end wall and a rod side end wall at its both ends;

a main piston which is disposed in the interior of the cylinder main body slidably in an axial direction thereof and where a rod side pressure receiving face to which a piston rod is attached and a head side pressure receiving face opposed thereto are different in pressure receiving area from each other;

a head side pressure chamber and a rod side pressure chamber which are formed on both sides of the main piston;

a pusher which is disposed in the interior of the cylinder main body at a position closer to the head side end wall or the rod side end wall rather than the main piston so as to be movable in the axial direction independently from the main piston and which has a stroke shorter than that of the main piston and serves as both means for pushing the main piston from a stroke end back to an intermediate stopping position and means for stopping the main piston at the intermediate stopping position; and pressing means for causing the pusher to displace up to the intermediate stopping position, wherein:

the pusher is formed in a short shaft shape and the pressing means is a spring;

the pusher is disposed in a receiving chamber positioned at a position closer to the head side end wall rather than the main piston in the interior of the cylinder main body and is biased towards the main piston by the spring; and the main piston has a shaft portion extending from an end face thereof on the head side into the receiving chamber in a sealed state to abut on the pusher, and the shaft portion has a diameter larger than that of the piston rod.

3. A 3-position stopping cylinder comprising:

a hollow cylinder main body which has a head side end wall and a rod side end wall at its both ends;

a main piston which is disposed in the interior of the cylinder main body slidably in an axial direction thereof and where a rod side pressure receiving face to which a piston rod is attached and a head side pressure receiving face opposed thereto are different in pressure receiving area from each other;

a head side pressure chamber and a rod side pressure chamber which are formed on both sides of the main piston;

a pusher which is disposed in the interior of the cylinder main body at a position closer to the head side end wall or the rod side end wall rather than the main piston so as to be movable in the axial direction independently from the main piston and which has a stroke shorter than that of the main piston and serves as both means for pushing the main piston from a stroke end back to an intermediate stopping position and means for stopping the main piston at the intermediate stopping position; and pressing means for causing the pusher to displace up to the intermediate stopping position, wherein the pusher is provided with an annular auxiliary piston portion and a hollow auxiliary rod portion extending from the auxiliary piston portion, and the pressing means is pressure fluid; and the cylinder main body has an auxiliary piston chamber formed at a position adjacent to the rod side pressure chamber via an annular partition wall, the auxiliary piston portion of the pusher is slidably received in the auxiliary piston chamber, the auxiliary rod portion is slidably supported to the partition wall via an outer periphery thereof to extend into the rod side pressure chamber, the piston rod penetrates the auxiliary piston portion and the interior of the auxiliary rod portion, and an auxiliary pressure chamber for supplying the pressure fluid is formed on one side of the auxiliary piston portion.

4. A 3-position stopping cylinder according to claim 3, wherein the rod side pressure chamber and the auxiliary pressure chamber communicate with each other via a passage provided inside or outside the cylinder main body.

5. A 3-position stopping cylinder comprising:

a hollow cylinder main body which has a head side end wall and a rod side end wall at its both ends;

a main piston which is disposed in the interior of the cylinder main body slidably in an axial direction thereof and where a rod side pressure receiving face to which a piston rod is attached and a head side pressure receiving face opposed thereto are different in pressure receiving area from each other;

a head side pressure chamber and a rod side pressure chamber which are formed on both sides of the main piston;

a pusher which is disposed in the interior of the cylinder main body at a position closer to the head side end wall or the rod side end wall rather than the main piston so as to be movable in the axial direction independently from the main piston and which has a stroke shorter than that of the main piston and serves as both means for pushing the main piston from a stroke end back to an intermediate stopping position and means for stopping the main piston at the intermediate stopping position; and pressing means for causing the pusher to displace up to the intermediate stopping position, wherein:

the pusher is formed in a piston shape and the pressing means is a pressure fluid; and the pusher is disposed in the interior of the cylinder main body so as to be slidable in a sealed state in an auxiliary piston chamber provided at a position closer to the head side end wall rather than the main piston in the interior of the cylinder main body, an auxiliary pressure chamber for supplying the pressure fluid is formed on one side of the pusher, the main piston has a shaft portion extending from an end face of the head side towards the pusher in a sealed state, and the shaft portion has a diameter larger than that of the piston rod.

6. A 3-position stopping cylinder comprising:

a hollow cylinder main body which has a head side end wall and a rod side end wall at its both ends;

a main piston which is disposed in the interior of the cylinder main body slidably in an axial direction thereof and where a rod side pressure receiving face to which a piston rod is attached and a head side pressure receiving face opposed thereto are different in pressure receiving area from each other;

a head side pressure chamber and a rod side pressure chamber which are formed on both sides of the main piston;

a pusher which is disposed in the interior of the cylinder main body at a position closer to the head side end wall or the rod side end wall rather than the main piston so as to be movable in the axial direction independently from the main piston and which has a stroke shorter than that of the main piston and serves as both means for pushing the main piston from a stroke end back to an intermediate stopping position and means for stopping the main piston at the intermediate stopping position; and pressing means for causing the pusher to displace up to the intermediate stopping position, wherein:

the cylinder main body has an auxiliary piston chamber formed adjacent to the head side pressure chamber and a sliding hole connecting the head side pressure chamber and the auxiliary piston chamber, the pusher is formed in a piston shape and is disposed in the auxiliary piston chamber so as to be slidable in a sealed state, a rod portion which extends towards the main piston to be fitted into the sliding hole in a sealed state at an advance stroke end of the pusher is provided on one side of the pusher, an auxiliary pressure chamber in which pressure fluid which is the pressing means is formed on the other side of the pusher; and the main piston has a shaft portion opposed to the rod portion on its end face on the head side, and the shaft portion has a diameter larger than that of the piston rod and has a length where the shaft portion can be fitted in the sliding hole in a sealed state only when the main piston is positioned in a stroke range of the retreat stroke end to the intermediate stopping position.

7. A 3-position stopping cylinder apparatus which is constituted by connecting a 3-position stopping cylinder according to any one of claim 1 and 2 to a common pressure fluid source via a single 3-position pressure center type switching valve, wherein the switching valve has a first switching position and a second switching position on both sides thereof, and an intermediate third switching position between the both sides, and the 3-position stopping cylinder apparatus is constituted such that the head side pressure chamber and the rod side pressure chamber of the cylinder are selectively connected to the pressure fluid source at the first and second switching positions and both the pressure chambers are simultaneously connected to the pressure fluid source at the intermediate third switching position.

8. A 3-position stopping cylinder apparatus which is constituted by connecting a 3-position stopping cylinder according to any one of claim 3,4,5 and 6 to a common pressure fluid source via a single 3-position pressure center type switching valve in a state that a pressure chamber on a side where the pusher has been provided and an auxiliary pressure chamber have been caused to communicate with each other, wherein the switching valve has a first switching position and a second switching position on both sides thereof, and an intermediate third switching position between the both sides, and the 3-position stopping cylinder apparatus is constituted such that the pressure chamber on the side where the pusher has been provided and the auxiliary pressure chamber, and another pressure chamber on the opposed side thereto are selectively connected to the pressure fluid source in the first and second switching positions, and the pressure chamber on the side where the pusher has been provided and the auxiliary pressure chamber, and the another pressure chamber on the opposed side thereto are simultaneously connected to the pressure fluid source in the intermediate third switching position.

* * * * *